United States Patent [19]
Esaki

[11] Patent Number: 5,127,888
[45] Date of Patent: Jul. 7, 1992

[54] DIFFERENTIAL GEAR FOR USE IN AN AUTOMOTIVE VEHICLE

[75] Inventor: Seiji Esaki, Hiroshima, Japan

[73] Assignee: Mazda Motor Corporation, Hiroshima, Japan

[21] Appl. No.: 662,575

[22] Filed: Mar. 1, 1991

[30] Foreign Application Priority Data

Mar. 3, 1990 [JP] Japan ................. 2-52361

[51] Int. Cl.$^5$ ............................................. F16H 47/00
[52] U.S. Cl. ........................................... 475/90; 475/93
[58] Field of Search ................. 475/84, 89, 90, 93

[56] References Cited

U.S. PATENT DOCUMENTS

| | | | |
|---|---|---|---|
| 2,978,929 | 4/1961 | Roberts | 475/89 |
| 3,251,244 | 5/1966 | Nickell | 475/90 |
| 4,272,993 | 6/1981 | Kopich | 475/90 |
| 4,630,505 | 12/1986 | Williamson | 475/90 |

FOREIGN PATENT DOCUMENTS

| | | | |
|---|---|---|---|
| 3844305 | 7/1990 | Fed. Rep. of Germany | 475/84 |
| 39-16429 | 1/1964 | Japan . | |

Primary Examiner—Richard Lorence
Assistant Examiner—Benjamin Levi
Attorney, Agent, or Firm—Wenderoth, Lind & Ponack

[57] ABSTRACT

A differential gear is to be interposed between an input shaft and first and second output shafts in an automotive vehicle. The differential gear includes a carrier rotatable together with the input shaft, a pair of first and second pinions disposed on one side of the carrier and rotatably supported on the carrier, a pair of third and fourth pinions disposed on the other side of the carrier and rotatably supported on the carrier, a first internal gear rotatable together with the first output shaft and having common rotational axis with the carrier, and a second internal gear rotatable together with the second output shaft and having a common rotational axis with the carrier. The first and second pinions are placed symmetrically with respect to the rotational axis of the carrier. Likewise, the third and fourth pinions are placed symmetrically with respect to the rotational axis of the carrier. The first and second internal gears are in mesh with the first and second pinions and the third and fourth pinions, respectively. On each side of the carrier, the set of one internal gear and two pinions constitutes two gear pumps.

6 Claims, 4 Drawing Sheets

1

DIFFERENTIAL GEAR FOR USE IN AN AUTOMOTIVE VEHICLE

BACKGROUND OF THE INVENTION

1. Field of the Invention

The present invention relates generally to a differential gear to be interposed between an input shaft and two output shafts in an automotive vehicle, and more particularly, to a differential gear internally provided with a plurality of gear pumps for driving the output shafts at different speeds by the pressure of oil discharged therefrom or for restricting the differential speed between the input shaft and the output shafts.

2. Description of the Prior Art

A differential gear, interposed between an input shaft and two output shafts, for driving both the output shafts at different speeds and for transmitting torque from the input shaft to the output shafts is well known. The differential gear is generally used, for example, as a front or rear differential gear in an automotive vehicle or as a central differential gear in a four-wheel-drive vehicle.

For example, in a differential gear as employed in the four-wheel-drive vehicle, if both the output shafts can freely rotate at different speeds, the following problem would occur. When front or rear wheels slip, most of the torque from a power unit is distributed to the wheels that are slipping whereas little torque is transmitted to the wheels that are not slipping. As a result, the driving force of the vehicle would substantially be lost.

Because of this, the differential gear is generally provided with a differential speed restricting mechanism for restricting the differential speed between the input shaft and the output shafts. A differential speed restricting mechanism employing a wet multi-plate clutch is conventionally known. In this kind of differential speed restricting mechanism, when the output shafts differ in speed, the clutch is actuated by hydraulic pressure and both the output shafts are mechanically connected to each other by virtue of frictional force between clutch plates, thereby restricting the differential speed. Since this differential speed restricting mechanism inevitably requires a wet multi-plate clutch, a hydraulic system and a hydraulic control system, the problem arose that the mechanism could not be formed to a compact size due to the complicated construction thereof.

To solve the above problems, Japanese Patent Laid-open Application (unexamined) No. 64-16429 discloses a differential gear for use in a four-wheel-drive vehicle, which includes two trochoid pumps interposed between an input shaft and output shafts for front and rear wheels. A first trochoid pump is constituted by a first internal gear rotatable together with the input shaft and a first external gear rotatable together with the output shaft for the front wheels, whereas a second trochoid pump is constituted by a second internal gear rotatable together with the input shaft and a second external gear rotatable together with the output shaft for the rear wheels. Torque of the input shaft is transmitted to the output shafts for the front and rear wheels by virtue of the resistance (load) of oil discharged from both the trochoid pumps.

In the conventional four-wheel-drive mechanism of this type including trochoid pumps, when the output shafts for the front and rear wheels differ in speed, oil is discharged from respective trochoid pumps so that both the output shafts may be independently driven by virtue of the resistance of oil discharged. As a result, it is possible to drive the front and rear wheels at different speeds and to effectively transmit torque thereto even in the event of wheel slippage or the like.

In the above four-wheel-drive mechanism, however, since the rotational centers of the first and second external gears are eccentrically positioned with respect to those of the first and second internal gears, respectively, the dynamic balance is lost driving pumping operation, thus undesirably producing vibration from the pumps.

Furthermore, in general, the amount of oil discharged from a gear pump such as a trochoid pump or the discharge pressure thereof generally pulsates, thereby causing the pulsation of torque to be transmitted to the output shafts for the front and rear wheels. This fact causes the problem that the front and rear wheels cannot be driven smoothly.

SUMMARY OF THE INVENTION

The present invention has been developed to overcome the above-described disadvantages.

It is accordingly an object of the present invention to provide a differential gear for use in an automotive vehicle, which is capable of effectively driving two output shafts without producing any vibration, even under the conditions in which the output shafts differ in speed or in driving resistance.

Another object of the present invention is to provide a differential gear of the above-described type which is simple and compact in construction and can be readily manufactured at a low cost.

In accomplishing these and other objects, a differential gear according to the present invention is interposed between an input shaft and first and second output shafts. The differential gear includes a carrier rotatable together with the input shaft, a pair of first and second pinions disposed on one side of the carrier in the direction of a rotational axis thereof and rotatably supported thereon, a pair of third and fourth pinions disposed on the other side of the carrier in the direction of the rotational axis thereof and rotatably supported thereon, a first internal gear rotatable together with the first output shaft and having a common rotational axis with the carrier, and a second internal gear rotatable together with the second output shaft and having a common rotational axis with the carrier.

The first and second pinions are placed symmetrically with respect to the rotational axis of the carrier. Likewise, the third and fourth pinions are placed symmetrically with respect to the same axis. The first internal gear is in mesh with the first and second pinions whereas the second internal gear is in mesh with the third and fourth pinions.

In the differential gear, two gear pumps are formed by the first internal gear and the first and second pinions, and two further gear pumps are formed by the second internal gear and the third and fourth pinions.

According to the present invention, since the first and second internal gears are not rigidly secured to each other, it is possible to drive the first and second output shafts, which rotate together with respective internal gears, at different speeds. The magnitude of torque to be transmitted to the first and second output shafts can be controlled by the pressure of oil discharged from two gear pumps formed on one side of the carrier and by the pressure of oil discharged from the other two gear pumps formed on the other side of the carrier, respectively. Accordingly, the first and second output shafts can be individually driven or the differential speed therebetween can be restricted by regulating the discharge pressures of the gear pumps, for example, by the provision of an orifice in an oil passage. As described above, since the differential gear having a differential speed restricting function can be constituted by the carrier, four pinions carried by the carrier, and two internal gears in mesh with the pinions, the differential gear requires no additional differential speed restricting mechanism, thus resulting in a simplified construction of the differential gear.

Although a pair of pinions move around the rotational axis of the carrier on each side of the carrier, centrifugal forces or inertia forces thereof are mutually canceled. Thus, the dynamic rotational balance of the pinions is stabilized because the pair of pinions are placed symmetrically with respect to the rotational axis of the carrier. Furthermore, since the rotational axis of the internal gear in mesh with the pair of pinions coincides with that of the carrier, around which axis the pinions can move, the entire rotational balance between the pinions and the internal gear is stabilized. In addition, the two gear pumps formed on one side of the carrier and the other two gear pumps formed on the other side of the carrier are placed symmetrically with respect to the center of the carrier in the direction of the rotational axis thereof thereby maintaining a balance of weight in such direction. Therefore, the entire dynamic rotational balance of the differential gear can be stabilized, and the occurrence of vibration can be effectively prevented.

Moreover, the provision of two gear pumps per one internal gear on each side of the carrier can double the amount of oil to be discharged, as compared with a differential gear as disclosed in Japanese Patent Laid-open Application No. 64-16429, in which a single oil pump is formed between an input shaft and one of a pair of output shafts.

Preferably, the phase of one gear pump and that of the other gear pump during a pumping operation are shifted 180° from each other on each side of the carrier. As a result, the pulsation of oil discharged from one gear pump and that of oil discharged from the other are mutually canceled, and the transmission of torque to the output shafts can be smoothed.

BRIEF DESCRIPTION OF THE DRAWINGS

These and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
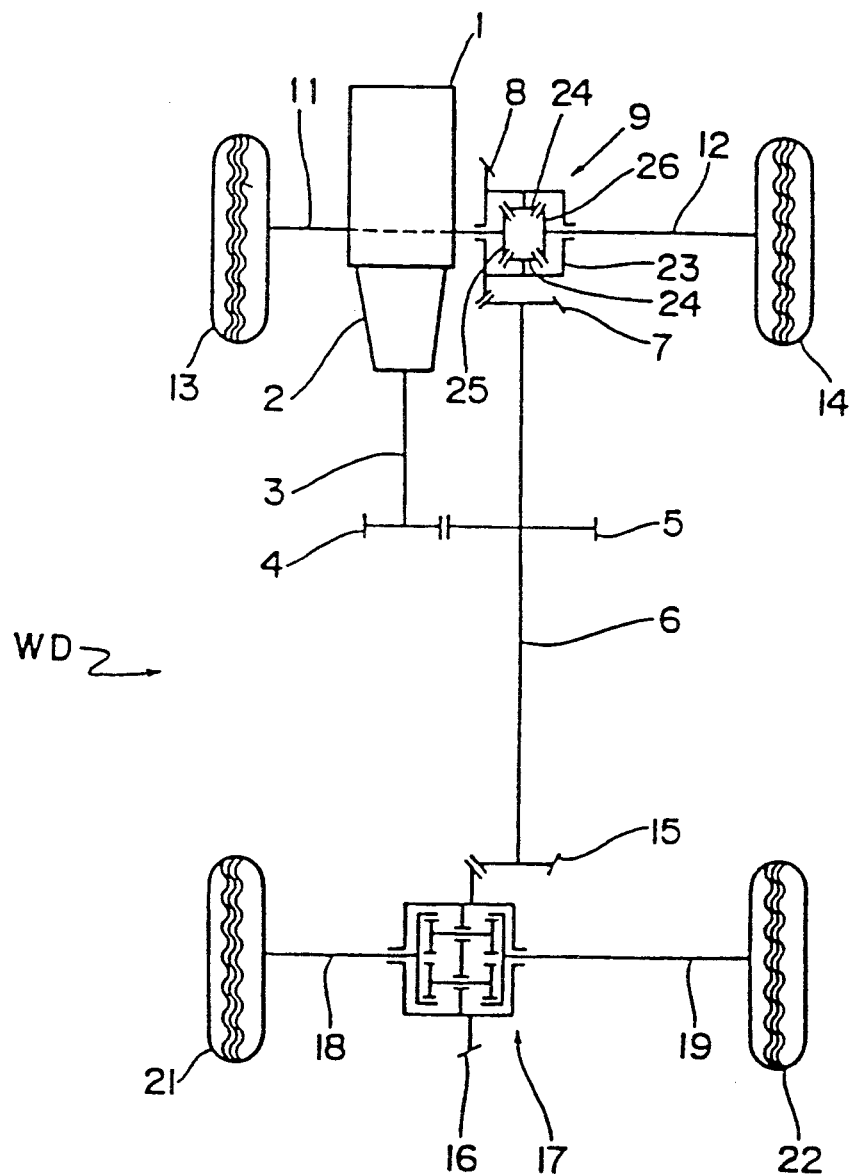
FIG. 1 is a schematic diagram of a driving system in a four-wheel-drive vehicle provided with a rear differential gear according to a first embodiment of the present invention.

Referring now to the drawings, there is schematically shown in FIG. 1 a driving system of a four-wheel-drive vehicle. Torque from an engine 1 is initially outputted to a main shaft 3 via a transmission 2 and then transmitted to a drive shaft 6 via a drive gear 4 and a driven gear 5 in mesh with each other.

Part of the torque transmitted to the drive shaft 6 is further transmitted to a front differential gear 9 via a front bevel gear 7 and a front ring rear 8 in mesh with each other, and then to front wheels 13 and 14 via respective front axle shafts 11 and 12. Furthermore, part of the torque from the drive shaft 6 is transmitted to a rear differential gear 17 via a rear bevel gear 15 and a rear ring gear 16 in mesh with each other, and then to rear wheels 21 and 22 via respective rear axle shafts 18 and 19.

The front differential gear 9 includes a differential casing 23 rotatable together with the front ring gear 8, a plurality of differential pinions 24 secured to the differential casing 23, and a pair of side gears 25 and 26 in mesh with the corresponding differential pinions 24 and rotatable together with respective front axle shafts 11 and 12, thereby enabling the front wheels 13 and 14 to rotate at different speeds.

Figure 2:
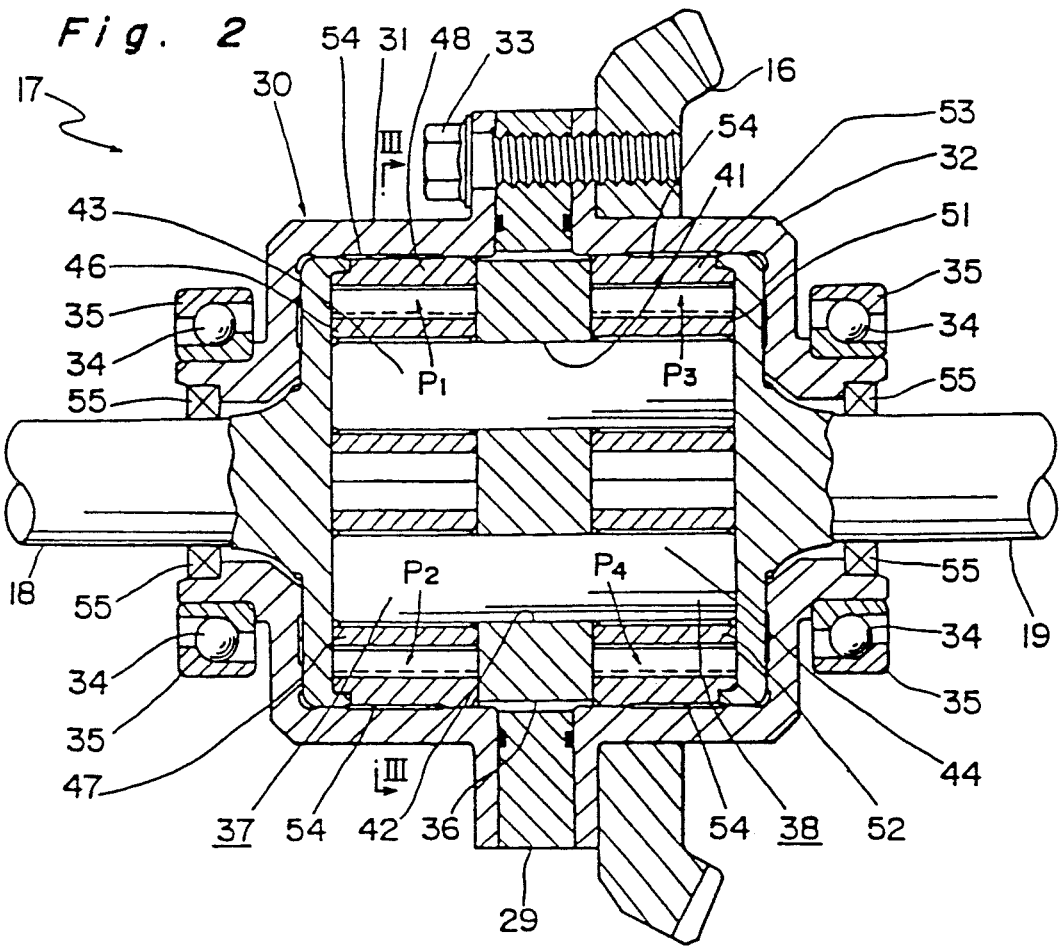
FIG. 2 is a cross-sectional view of the rear differential gear according to the present invention.

On the other hand, the rear differential gear 17 is internally provided with four gear pumps P1-P4, as shown in FIG. 2. The torque of the drive shaft 6 is transmitted to the rear axle shafts 18 and 19 by virtue of resistance (load) of hydraulic oil discharged from the pumps P1-P4.

As shown in FIG. 2, the rear differential gear 17 includes an intermediate ring 29 and a hollow cylindrical housing 30 consisting of a pair of opposed cylindrical casings 31 and 32 having respective outwardly extending flanges, between which the intermediate ring 29 is sandwiched. The rear ring gear 16 is secured to the housing 30 by means of fastening bolts 33 extending through the intermediate ring 29 and the outwardly extending flanges of the casings 31 and 32. The housing 30 is rotatably carried at its opposite ends by respective fixed portions 35 via ball bearings 34.

The housing 30 accommodates a disc-like carrier 36 secured thereto at a central location in the direction of the axis thereof and extending in a direction perpendicular to the axis thereof. The carrier 36 partitions the inside of the hollow cylindrical housing 30 into a first compartment 37 and a second compartment 38. The carrier 36 is provided with two through-holes 41 and 42 formed symmetrically with respect to the axis thereof. A first pinion shaft 43 is rotatably mounted in a first through-hole 41 whereas a second pinion shaft 44 is rotatably mounted in a second through-hole 42.

In the first compartment 37, a first pinion 46 provided with external teeth and a second pinion 47 provided with external teeth are rotatably mounted on the first and second pinion shafts 43 and 44, respectively. The first and second pinions 46 and 47 are not in mesh with each other. A first internal gear 48 is provided with internal teeth in mesh with the external teeth of the first and second pinions 46 and 47 and is coaxial with the housing 30 and the carrier 36. The first internal gear 48 is secured to the left-hand rear axle shaft 18 and can rotate together therewith.

In the second compartment 38, a third pinion 51 provided with external teeth and a fourth pinion 52 provided with external teeth are rotatably mounted on the first and second pinion shafts 43 and 44, respectively. A second internal gear 53 is provided with internal teeth in mesh with the external teeth of the third and fourth pinions 51 and 52 and is coaxial with the housing 30 and the carrier 36. The second internal gear 53 is secured to the right-hand rear axle shaft 19 and can rotate together therewith.

A number of ball bearings 54 are interposed between the internal surface of the housing 30 and the external surfaces of the first and second internal gears 48 and 53 so that the housing 30 and the first and second internal gears 48 and 53 can rotate relative to each other. The housing 30 can rotate relative to the rear axle shafts 18 and 19, and sealing members 55 are interposed between opposite ends of the former and the latter.

Only the above-described construction without any gear pumps P1–P4 cannot rotate the rear axle shafts 18 and 19 because even when the carrier 36 (housing 30) rotates about its axis, torque is not transmitted from the first and second pinions 46 and 47 to the first internal gear 48 and from the third and fourth pinions 51 and 52 to the second internal gear 53.

In order to transmit the torque from the carrier 36 to both the rear axle shafts 18 and 19, the first to fourth gear pumps P1–P4 are provided within the housing 30. More specifically, in the first compartment 37, the first gear pump P1 comprises the first pinion 46 and the first internal gear 48 whereas the second gear pump P2 comprises the second pinion 47 and the first internal gear 48. In the second compartment 38, the third gear pump P3 comprises the third pinion 51 and the second internal gear 53 whereas the fourth gear pump P4 comprises the fourth pinion 52 and the second internal gear 53.

The following description will be made with respect to the first and second gear pumps P1 and P2 in the first compartment 37 because the internal construction of the second compartment 38 is the same as that of the first compartment 37.

Figure 3:
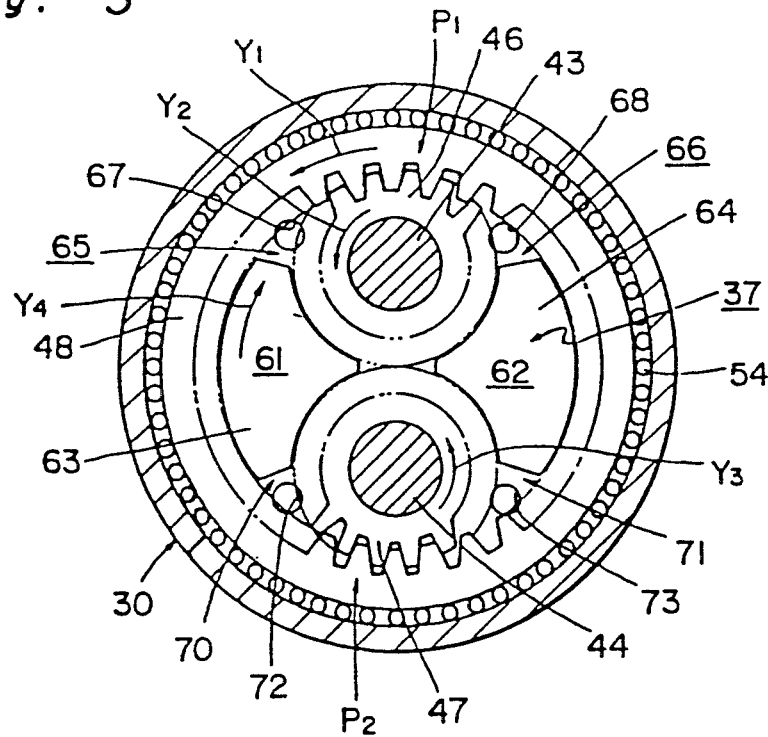
FIG. 3 is a sectional view taken along line III—III in FIG. 2.

As shown in FIG. 3, in the first compartment 37, first and second partition members 63 and 64 are fitted in first and second recesses 61 and 62 substantially in the form of respective sectors defined between the first and second pinions 46 and 47 and the first internal gear 48.

The first and second partition members 63 and 64 are cut out at locations close to the mating portions between the first pinion 46 and the first internal gear 48 so that first and second oil chambers 65 and 66 for the first gear pump P1 are defined in recesses formed by such cut-outs. The first and second oil chambers 65 and 66 communicate with first and second oil passages 67 and 68, respectively. When the first internal gear 48 rotates in the direction shown by an arrow Y1 and the first pinion 46 in mesh therewith rotates in the direction shown by an arrow Y2, the first oil chamber 65 operates as an oil suction side while the second oil chamber 66 operates as an oil discharge side. In contrast, when the first internal gear 48 rotates in the direction opposite to the arrow Y1, the suction side and the discharge side are reversed.

The first and second partition members 63 and 64 are also cut out at locations close to the mating portions between the second pinion 47 and the first internal gear 48 so that third and fourth oil chambers 70 and 71 for the second gear pump P2 are defined in recesses formed by such cut-outs. The third and fourth oil chambers 70 and 71 communicate with third and fourth oil passages 72 and 73, respectively. When the first internal gear 48 rotates in the direction of the arrow Y1 and the second pinion 47 in mesh therewith rotates in the direction shown by an arrow Y3, the third oil chamber 70 operates as an oil suction side while the fourth oil chamber 71 operates as an oil discharge side.

Figure 4:
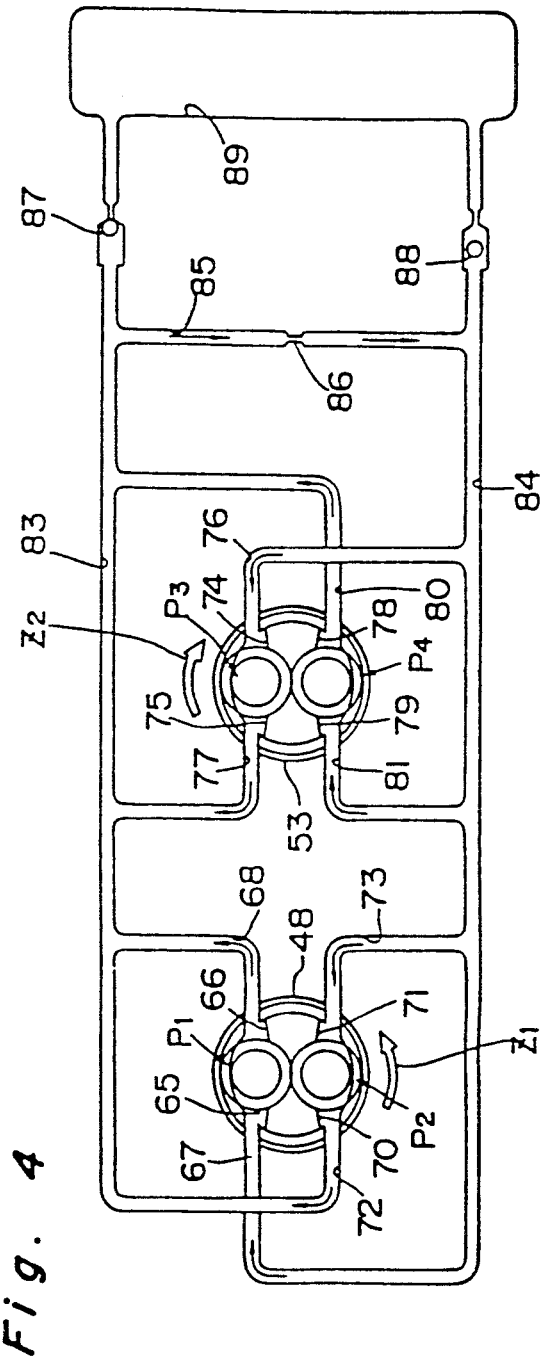
FIG. 4 a schematic piping diagram indicative of oil flow in the rear differential gear of FIG. 2.

As shown in FIG. 4, fifth and sixth oil chambers 74 and 75 for the third gear pump P3 communicating with respective fifth and sixth oil passages 76 and 77 are defined in the second compartment 38, similar to the oil chambers defined in the first compartment 37. Likewise, seventh and eighth oil chambers 78 and 79 for the fourth gear pump P4 communicating with respective seventh and eighth oil passages 80 and 81 are defined in the second compartment 38.

All of the second oil passage 68 for the first gear pump P1, the third oil passage 72 for the second gear pump P2, the sixth oil passage 77 for the third gear pump P3, and the seventh oil passage 80 for the fourth gear pump P4 communicate with a first common oil passage 83. These oil passages 68, 72, 77 and 80 form the oil discharge side, i.e. the high pressure side, when the first and second internal gears 48 and 53 rotate in the directions shown by arrows Z1 and Z2, respectively. In contrast, when the first and second internal gears 48 and 53 rotate in the directions opposite to the arrows Z1 and Z2, the oil passages 68, 72, 77 and 80 form the oil suction side, i.e. the low pressure side. In FIG. 4, the first and second gear pumps P1 and P2 indicate the state as viewed from the left-hand rear axle shaft while the third and fourth gear pumps P3 and P4 indicate the state as viewed from the right-hand rear axle shaft. Accordingly, when viewed in three dimensions, the direction of the arrow Z1 and that of the arrow Z2 are the same and coincide with the direction of the arrow Y1 in FIG. 3.

All the first oil passage 67 for the first gear pump P1, the fourth oil passage 73 for the second gear pump P2, the fifth oil passage 76 for the third gear pump P3, and the eighth oil passage 81 for the fourth gear pump P4 communicate with a second common oil passage 84. These oil passages 67, 73, 76 and 81 form the oil suction side, i.e. The low pressure side when the first and second internal gears 48 and 53 rotate in the directions shown by the arrows Z1 and Z2, respectively. In contrast, when the first and second internal gears 48 and 53 rotate in the directions opposite to the arrows Z1 and Z2, the oil passages 67, 73, 76 and 81 form the oil discharge side, i.e., the high pressure side.

The first and second common oil passages 83 and 84 communicate with a low pressure oil chamber 89, in which oil having a relatively low pressure is stored. First and second one-way valves 87 and 88 for permitting only an oil flow from the low pressure oil chamber 89 towards the gear pumps P1–P4 are provided in respective first and second common oil passages 83 and 84 in the proximity of the low pressure oil chamber 89. Regardless of the direction of rotation of the first and second internal gears 48 and 53, the one-way valves 87 and 88 enable the oil in the low pressure oil chamber 89 always to be supplied to the gear pumps P1–P4 and can maintain the internal pressure of the low pressure oil chamber 89 suitably low so that the oil will not leak through the seals thereof.

A by-pass oil passage 85 for connecting the first and second common oil passages 83 and 84 to each other is provided between the one-way valves 87 and 88 and the gear pump. An orifice 86 having a certain resistance to oil flow is provided in the by-pass oil passage 85. Because of this, the oil flows from the high pressure oil passage (the first common oil passage 83 in the case of FIG. 4) to the low pressure oil passage through the orifice 86. The oil flow produces a flow resistance, which further produces a discharge pressure in the discharge side chambers of the gear pumps P1-P4.

The operation of the rear differential gear 17 will be discussed hereinafter with reference to FIGS. 2 to 4.

When the carrier 36 (housing 30) rotates in the direction shown by an arrow Y4 in FIG. 3, the first and second internal gears 48 and 53 rotate in the directions shown by arrows Z1 and Z2, respectively, in FIG. 4. As a result, the gear pumps P1-P4 discharge oil to the oil chambers 66, 70, 75, and 78 communicating with the first common oil passage 83 at a discharge pressure in accordance with the characteristic of the orifice 86. According to the resistance (load) of oil, torque is transmitted from the first and second pinions 46 and 47 to the first internal gear 48 and from the third and fourth pinions 51 and 52 to the second internal gear 53. Since the first and second internal gears 48 and 53 are not mechanically connected to each other and are driven by the respective gear pumps P1-P4, the first and second internal gears 48 and 53 can rotate individually. Furthermore, regardless of the magnitude of resistance imposed upon the rear wheels or the presence or absence of slip of the rear wheels, the torque always can be transmitted to both the internal gears 48 and 53. As described above, without any additional differential speed restricting mechanism, a single rear differential gear 17 having a simple construction can drive both the rear wheels 21 and 22 at different speeds. As a matter of course, the speed of the rear axle shafts 18 and 19 can be varied relative to that of the drive shaft 6.

In the first compartment 37, although the first and second pinions 46 and 47 move around the rotational axis of the carrier 36, the dynamic rotational balance therebetween is stabilized. The reason for this is that since both the pinions 46 and 47 are positioned symmetrically with respect to the rotational axis of the carrier 36, i.e. The axis of revolution of the pinions 46 and 47, centrifugal forces or inertia forces thereof are mutually canceled. Furthermore, since the rotational axis of the first internal gear 48 in mesh with the first and second pinions 46 and 47 coincides with the axis of revolution of both the pinions 46 and 47, the entire rotational balance of the first internal gear 48 and both the pinions 46 and 47 is also stabilized. Likewise in the second compartment 38, stabilization of the rotational balance between the third and fourth pinions 51 and 52 and stabilization of the entire rotational balance of the second internal gear 53 and both the third and fourth pinions 51 and 52 are achieved. In addition, the arrangement in which the first and second pinions 46 and 47 and the third and fourth pinions 51 and 52 are placed symmetrically with respect to a central location of the housing 30 in the longitudinal direction thereof can unify the distribution of load inside the rear differential gear 17 in the longitudinal direction of the housing 30, thus stabilizing the entire rotational balance of the rear differential gear 17.

Moreover, the fact that each of the first and second compartments 37 and 38 accommodates two gear pumps P1, P2 or P3, P4 can double the amount of oil to be discharged on the whole, thereby enabling the rear differential gear 17 to be made to a compact size.

Figure 5:
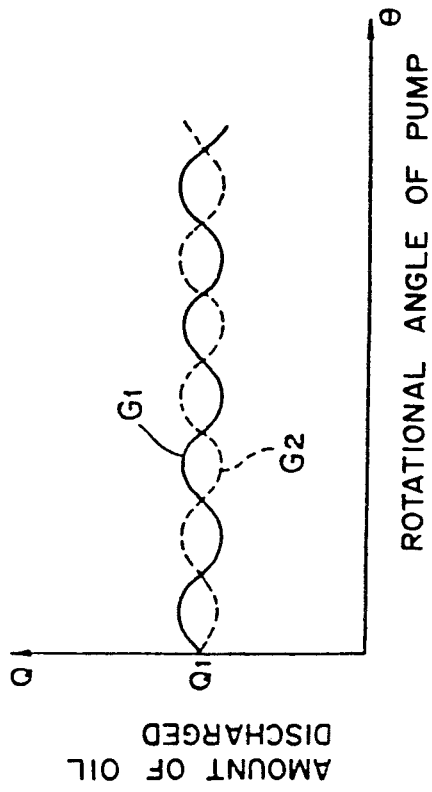
FIG. 5 is a graph indicative of the relationship between the amount of oil discharged from first and second gear pumps and the rotational angle thereof.

In general, the amount of oil discharged from a gear pump and the discharge pressure thereof pulsate with respect to the rotational angle thereof. In this embodiment, to reduce such pulsation, the number of teeth of the first internal gear 48 is provided to be an odd number and the phase of the first gear pump P1 and that of the second gear pump P2 during pumping operation are shifted 180° from each other. FIG. 5 represents characteristic curves G1 and G2 indicative of the relationship between the amount of oil Q to be discharged from the first and second gear pumps P1 and P2 and the rotational angle $\theta$ thereof. Since all the oil passages from and to the first and second gear pumps P1 and P2 communicate with the first or second common oil passage 83 or 84, the pulsation of oil discharged from the first gear pump P1 and that of oil discharged from the second gear pump P2 are mutually canceled. Accordingly, the transmission of torque from the carrier 36 to the first and second internal gears 48 and 53 can be smoothed.

Figure 6:
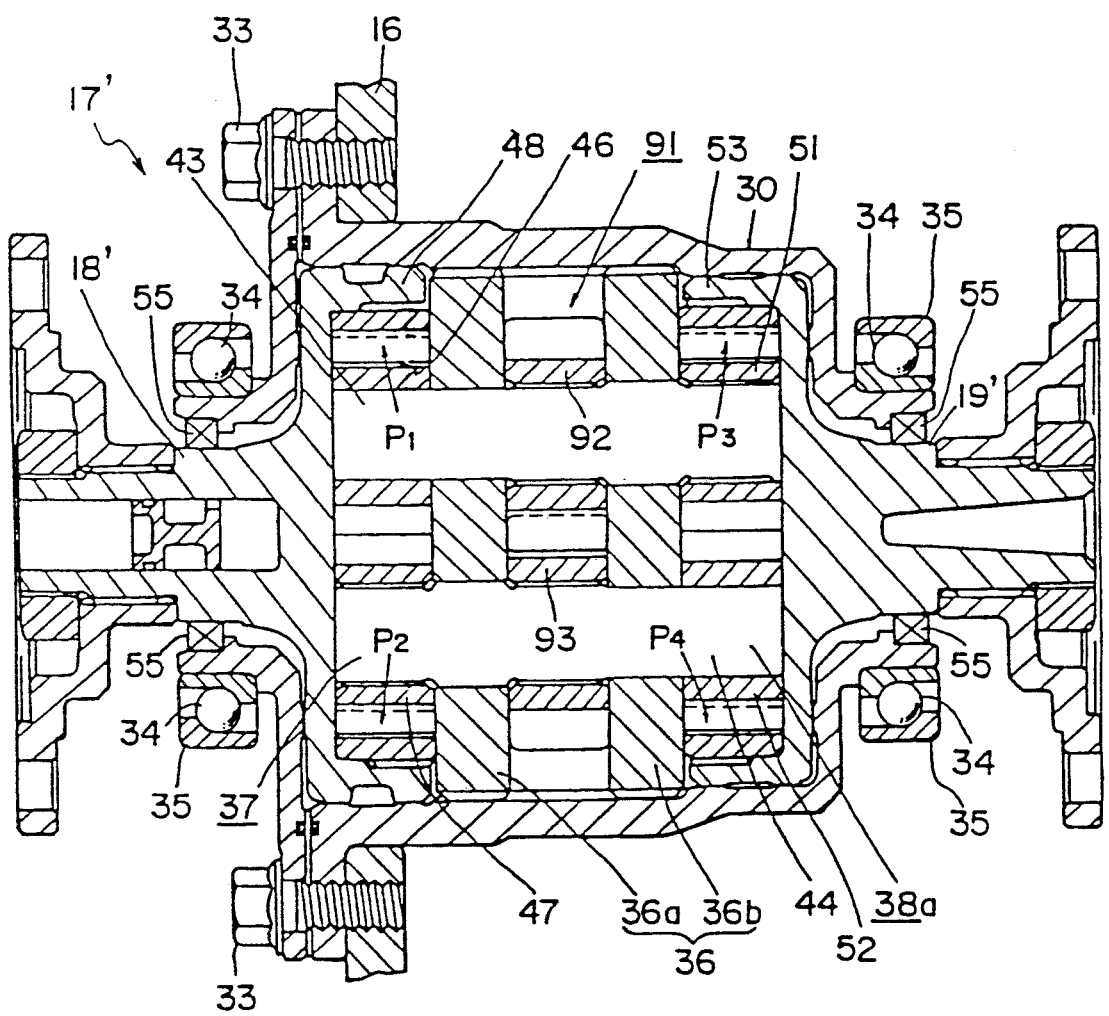
FIG. 6 is a view similar to FIG. 2, which particularly shows a central differential gear according to a second embodiment of the present invention.

FIG. 6 depicts a central differential gear 17' according to a second embodiment of the present invention, which can drive a front output shaft 18' for the front wheels and a rear output shaft 19, for the rear wheels at different speeds.

In the second embodiment, a carrier 36 comprises two discs 36a and 36b spaced from each other in the longitudinal direction of a housing 30. A third compartment 91 is defined between the discs 36a and 36b. In the third compartment 91, a first gear 92 is splined to a first pinion shaft 43 whereas a second gear 93 is splined to a second pinion shaft 44. The first and second gears 92 and 93 are in mesh with each other, and therefore, the first and second pinion shafts 43 and 44 rotate at the same speed during opposite directions in operation. The first and second gears 92 and 93 may constitute a gear pump.

The first pinion 46 is not splined to the first pinion shaft 43 and can freely rotate relative thereto. Likewise, the second pinion 52 is not splined to the second pinion shaft 44 and can freely rotate relative thereto.

In the above-described construction, a first internal gear 48 and a second internal gear 53 are mechanically coupled to each other but can rotate at different speeds. Both the first internal gear 48 (front output shaft 18') and the second internal gear 53 (rear output shaft 19') are driven by the carrier 36 (housing 30).

When the resistance of the first internal gear 48 for the front wheels is equal to that of the second internal gear 53 for the rear wheels, neither the first pinion 46 nor the second pinion 47 does not rotate about their axis, but rather both pinions 46 and 47 only move around the longitudinal axis of the housing 30 with the same teeth being in mesh with the first internal gear 48. Likewise, neither the third pinion 51 nor the fourth pinion 52 rotate about their axes, but rather both pinions 51 and 52 only move around the longitudinal axis of the housing 30 with the same teeth being in mesh with the second internal gear 53. In this event, since all the gear pumps P1-P4 stop pumping and do not discharge oil, the first and second internal gears 48 and 53 can freely rotate at different speeds.

On the other hand, when the first and second internal gears 48 and 53 differ in speed, for example when the resistance of the second internal gear 53 becomes large and reduces the speed thereof, the third and fourth pinions 51 and 52 rotate about their respective axes, thereby rotating the second internal gear 53. As a result, oil is discharged from the third and fourth gear pumps P3 and P4. Likewise, the first and second pinions 46 and 47 also rotate about their respective axes, thereby enabling the first and second gear pumps P1 and P2 to discharge oil. In this event, in proportion to the resistance of the oil, torque is transmitted from the first and second pinions 46 and 47 to the first internal gear 48 and from the third and fourth pinions 51 and 52 to the second internal gear 53. Accordingly, the differential speed between the first and second internal gears 48 and 53 is restricted in proportion to the resistance of the oil. In this way, when the first and second internal gears 48 and 53 differ in speed, the differential speed therebetween is restricted. As a result, even if either the front wheels or the rear wheels slip, both of them can be effectively driven.

In the second embodiment also, it is of course possible to make the central differential gear compact, to reduce vibration by stabilizing the rotational balance, and to reduce pulsation of the amount of oil discharged or of the discharge pressure thereof, as in the first embodiment.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A differential gear to be interposed between an input shaft and first and second output shafts of an automotive vehicle, said differential gear comprising:
    a carrier rotatable about a rotational axis thereof by the input shaft;
    a pair of first and second pinions rotatably supported on said carrier on a first side thereof with respect to the direction of said rotational axis thereof, said first and second pinions being positioned symmetrically with respect to said rotational axis;
    a first internal gear rotatable with the first output shaft about a rotational axis coaxial with said rotational axis of said carrier, said first internal gear being in meshing engagement with said first and second pinions;
    a pair of third and fourth pinions rotatably supported on said carrier on a second side thereof with respect to said direction of said rotational axis thereof, said third and fourth pinions being positioned symmetrically with respect to said rotational axis of said carrier;
    a second internal gear rotatable with the second output shaft about a rotational axis coaxial with said rotational axis of said carrier, said second internal gear being in meshing engagement with said third and fourth pinions;
    each of said first, second, third and fourth pinions not being in direct meshing engagement with any other of said pinions;
    said first internal gear and said first and second pinions defining two gear pumps; and
    said second internal gear and said third and fourth pinions defining two further gear pumps.

2. A differential gear as claimed in claim 1, further comprising a cylindrical housing to be driven by the input shaft and accommodating said carrier, said first to fourth pinions, and said first and second internal gears, and wherein said carrier is secured to said housing.

3. A differential gear as claimed in claim 2, wherein said carrier is substantially in the form of a disc and is positioned at the center of said housing in a direction of a longitudinal axis thereof, such that the inside of said housing is partitioned by said carrier into first and second compartments.

4. A differential gear as claimed in claim 3, further comprising first and second pinion shafts extending through said carrier in directions parallel to said longitudinal axis of said housing, and wherein said first and second pinions are rotatably mounted on said first and second pinion shafts, respectively, in said first compartment, and said third and fourth pinions are rotatably mounted on said first and second pinion shafts, respectively, in said second compartment.

5. A differential gear as claimed in claim 1, further comprising first and second pinion shafts extending through said carrier in directions parallel to said rotational axis thereof, and wherein said first and second pinions are rotatably mounted on said first and second pinion shafts, respectively, at said first side of said carrier, and said third and fourth pinions are rotatably mounted on said first and second pinion shafts, respectively, at said second side of said carrier.

6. A differential gear as claimed in claim 1, wherein each of said pumps has therein two recesses respectively connected to two common oil passages which mutually communicate through an orifice, whereby torque is transmitted from said first and second internal gears to said first and second pinions and to said third and fourth pinions, respectively, by virtue of the resistance of said orifice to oil flow.

* * * * *